United States Patent [19]

Jhabvala et al.

[11] Patent Number: 5,029,216

[45] Date of Patent: Jul. 2, 1991

[54] VISUAL AID FOR THE HEARING IMPAIRED

[75] Inventors: Murzban D. Jhabvala, Clarksville; Hung C. Lin, Silver Spring, both of Md.

[73] Assignee: The United States of America as represented by the Administrator of the National Aeronautics & Space Administration, Washington, D.C.

[21] Appl. No.: 363,807

[22] Filed: Jun. 9, 1989

[51] Int. Cl.⁵ .......................................... H04R 25/00
[52] U.S. Cl. .................................... 381/68.1; 381/26; 381/92
[58] Field of Search ................... 381/68, 68.1, 68.7, 381/92, 122, 26; 340/901, 902, 903, 904; 367/121, 124, 122, 123

[56] References Cited

U.S. PATENT DOCUMENTS

| | | | |
|---|---|---|---|
| 3,568,144 | 3/1971 | Streb | 340/901 |
| 3,626,365 | 12/1971 | Press et al. | 381/92 |
| 3,927,388 | 12/1975 | Medrano | 367/124 |
| 4,212,085 | 7/1980 | Vaillancour et al. | 367/124 |
| 4,712,244 | 12/1987 | Zwicker et al. | 381/92 |
| 4,794,394 | 12/1988 | Halstead | 340/903 |

Primary Examiner—Forester W. Isen
Assistant Examiner—M. Nelson McGeary, III
Attorney, Agent, or Firm—R. Dennis Marchant; Harold W. Adams; Ronald F. Sandler

[57] ABSTRACT

A multi-channel electronic visual aid device which is able to signal to the user whether sound is coming from the left or right, front or back, or both. For the plurality of channels, which may operate in pairs, the sound is picked up by a respective microphone and amplified and rectified into a DC voltage. The DC voltage is next fed to an analog to digital converter and then to a digital encoder. The binary code from the encoder is coupled into a logic circuit where the binary code is decoded to provide a plurality of output levels which are used to drive an indicator which, in turn, provides a visual indication of the sound level received. The binary codes for each pair of channels are also fed into a digital comparator. The output of the comparator is used to enable the logic circuits of the two channels such that if, for example, the signal coming from the right is louder than that coming from the left, the output of the logic unit of the right channel will be enabled and the corresponding indicator activated, indicating the sound source on the right. An indication of the loudness is also provided. One embodiment of the invention may be carried by the hearing impaired or deaf, as a system, for example, which is embedded into eye glasses or a cap. Another embodiment of the invention may be integrated with a vehicle to give a hearing impaired or deaf driver a warning, with a directional indication, that an emergency vehicle is in the vicinity. In this second embodiment, the emergency vehicle transmits an RF signal which would be used as an enabling signal for the visual aid device to avoid false alarms from traffic and other sound sources in the vicinity of the dirver's vehicle.

14 Claims, 7 Drawing Sheets

VISUAL AID FOR THE HEARING IMPAIRED

ORIGIN OF THE INVENTION

The invention described herein was made in the performance of work under a NASA contract and by an employee of the United States Government and is subject to Public Law 96-517 (35 U.S.C. §200 et seq.). The contractor has not elected to retain title to the invention.

TECHNICAL FIELD

The invention relates generally to hearing aid apparatus and more particularly to a multi-channel electronic device for the hearing impaired or deaf providing a visual indication as to directivity and loudness of the sounds received.

BACKGROUND ART

This invention has particular utility in providing hearing impaired persons with an indication not only of specific sounds, but the direction from which they emanate. A common but very difficult problem exists among individuals who are totally deaf in one ear. While these individuals are able to hear adequately with hearing aid devices, they are unable to quickly discern the direction from which the sound originates. Normally this is not a life threatening problem. Situations, however, do exist where such individuals must be made immediately aware of the origin of the sound, particularly a loud sound. Typical examples include general automobile traffic, fire alarms, loading dock traffic, sirens and variety of less common audibles, but of equal warning power. Recent contact with such individuals having this type of hearing disability has dramatically emphasized the severity of the problem. In addition, people who are totally deaf or hearing impaired encounter difficulties while operating a motor vehicle with respect to hearing and locating an emergency vehicle in the vicinity.

It is an object of this invention to provide an improvement in visual aids for the hearing impaired or deaf.

It is another object of this invention to provide a visual aid which is directionally sensitive.

It is a further object of this invention to provide an improvement in visual aids which are able to detect not only the direction from which the sound originates, but also to provide a visual indication of both the direction and intensity of the sounds.

It is still another object of this invention to provide a directional visual aid comprised of integrated circuits in order to minimize size and power dissipation.

STATEMENT OF THE INVENTION

The foregoing and other objects of the invention are achieved by a multi-channel electronic, usually indicating device which is able to signal to the wearer in a binaural or a quadraphonic configuration whether sound is coming from the left or right, front or back, or both. For each channel, which operate in pairs, the sound is picked up by a respective microphone amplified and rectified into a DC voltage. The DC voltage is next fed to a three bit analog to digital converter comprised of seven parallel comparators and an eight by three encoder. The three bit binary codes from the encoder are coupled into a logic circuit where the three bit binary codes are decoded to seven output levels which are used to drive an indicator which provides a visual indication of the sound level received. The three bit binary codes for each pair of channels are also fed into a digital comparator. The output of the comparator is used to enable the logic circuits of the two channels such that if, for example, the signal coming from the right is louder than that coming from the left, the outputs of the logic unit of the right channel will be enabled and the corresponding indicator activated, indicating the direction of the sound source. Also an indication of the loudness is provided for that channel. Our preferred embodiment only gives an indication for the stronger channel because it is deemed that a multiple channel indication, with relative volumes being indicated, would lead to confusion.

DETAILED DESCRIPTION OF THE INVENTION

Figure 1:
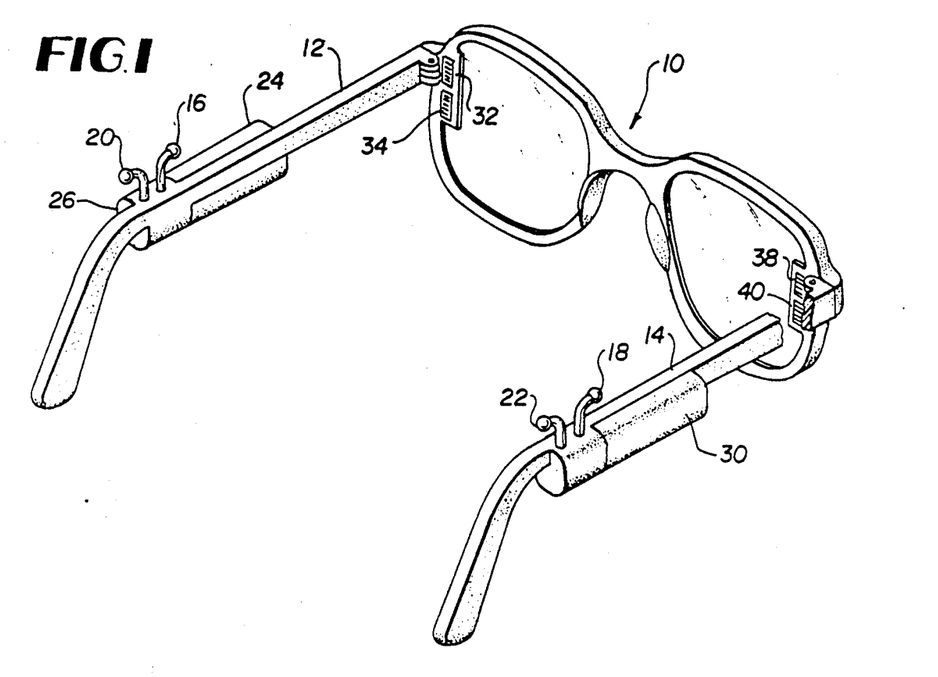
FIG. 1 is a perspective view generally illustrative of a four channel or quadraphonic visual aid in accordance with the subject invention which is carried by a pair of eyeglasses.

With respect to the drawings wherein like reference numerals refer to like components throughout, FIG. 1 discloses a directional visual aid included in the frame 10 a pair of eyeglasses. The configuration of FIG. 1, moreover, is intended to illustrate the concept of a directional visual aid wherein the wearer can be visually alerted to sounds coming from four directions, namely left, right, front and rear. Further as shown the left and right temples 12 and 14 have a pair of front and rear directional microphones 16, 18, and 20, 22, respectively, mounted thereon. The left temple 12, moreover, includes a battery compartment 24 and an amplifier module 26 for the microphones 16 and 20. The right temple 28 in addition to including an amplifier module 28 for the microphones 18 and 22 also includes a logic unit 30 which includes integrated circuitry of the type to be described hereinafter to detect the direction from which sounds are received and drive four light emitting diode (LED) devices, two of which 32 and 34 are located in the left lens rim 36 while the other two 38 and 40 are located in the right lens rim 42. Although this embodiment describes a display system based on LED devices, other types of indicators could be implemented, such as vibrating tactile devices. The LED 32, in the example, would be used to display the existence of sounds coming from the front left of the wearer, while LED 34 would be used in indicate sounds coming from the left rear. In the same fashion, the LED 38 would indicate sounds coming from the right front, while the LED 40 would indicate sounds coming from the right rear. The brightness of the light generated by four LED's would be further modulated to indicate the loudness of the respective sounds coming from the four directions.

It should be recognized that while FIG. 1 illustrates an embodiment of the invention where the support means for the electronics are a pair of eyeglasses and the LED's integrated with the frame, neither LED's nor frame integration are critical. Other types of visual indicators could be used and, for example, could be integrated into the lenses.

Figure 2:
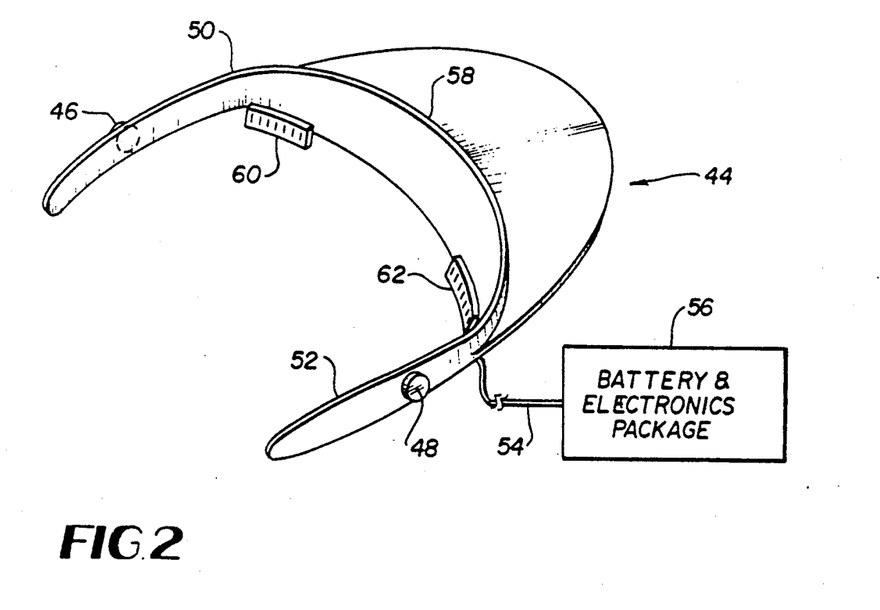
FIG. 2 is a perspective view generally illustrative of a two channel or visual aid in accordance with the subject invention which is carried by a sun visor which is worn by the user.

Referring now to FIG. 2, there is disclosed a binaural or two channel embodiment of the invention which is supported by a piece of headwear such as a sun visor 44. It could, however, be included in a cap of any desired type. What is significant is that left and right directional microphones 46 and 48 are located on the left and right side of the head of the wearer. As shown, the microphones 46 and 48 are located along the temple members 50 and 52 of the visor and are coupled by means of electrical wiring 54 to a composite battery and electronic package 56. On the forehead band portion 58 on the outer extremity thereof, there is located a pair of light bar display elements 60 and 62 which are for the purpose of providing an indication of sound coming from either the left or right direction and the loudness or intensity thereof.

Figures 3, 5:
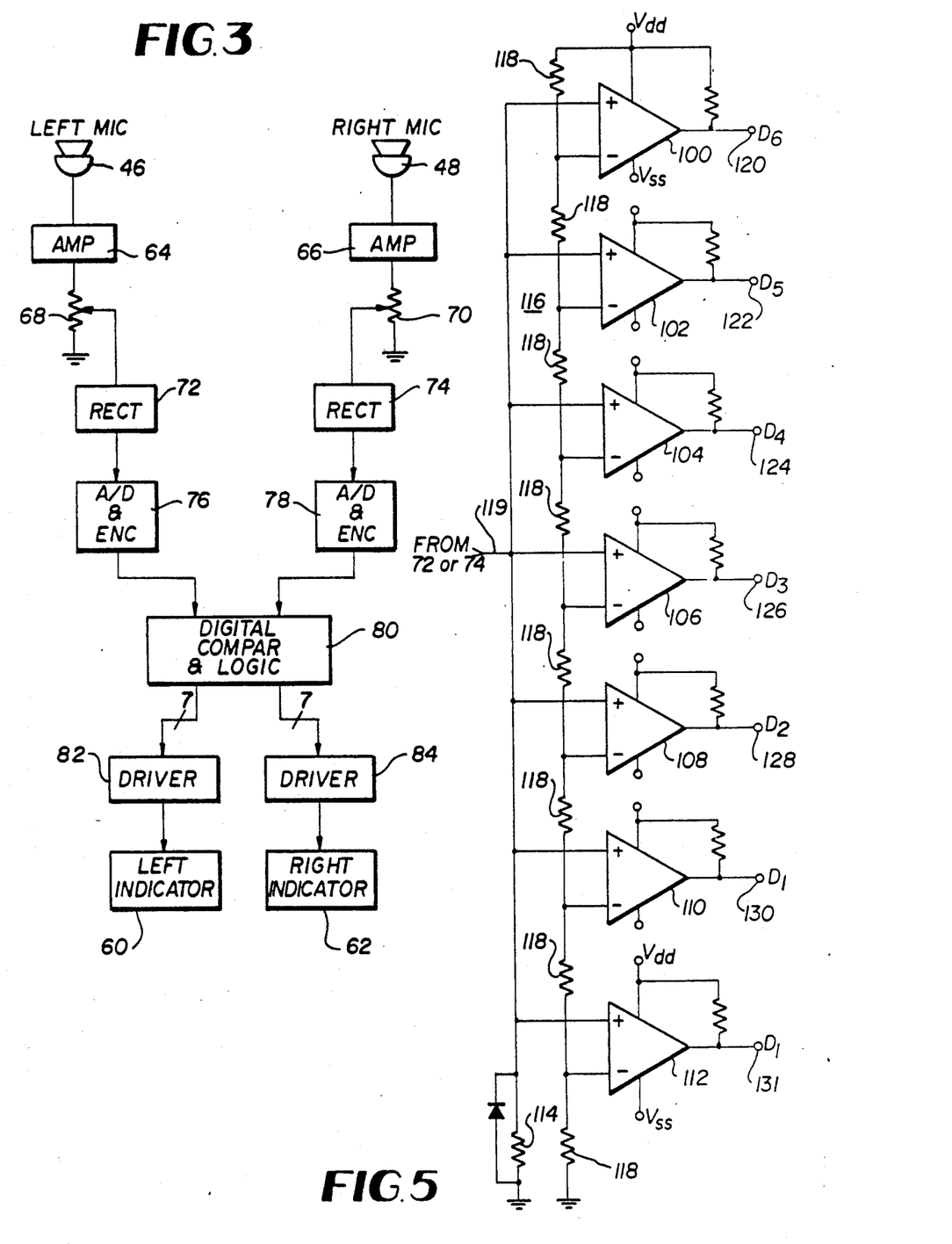
FIG. 3 is an electrical block diagram illustrative of the circuitry included in the preferred embodiment of a two channel visual aid in accordance with the subject invention.
FIG. 5 is an electrical schematic diagram illustrative of the analog to digital converter shown in FIG. 4.

Turning attention now to the electronics circuitry for implementing either of the two embodiments shown in FIG. 1, FIG. 3, for example, discloses a block diagram for a two channel system for detecting sounds coming from the left and right It should be understood, however, that the same circuitry would merely be duplicated for a four channel system where front and back directivity is desired.

Considering FIG. 3, the left and right microphones 46 and 48 of FIG. 2, are coupled to respective audio amplifiers 64 and 66. The output of each of the amplifiers 64 and 66 are connected to electrical resistive potentiometer elements 68 and 70 for providing means for adjusting the output level or volume for each of the signal channels. The slider portions of the two potentiometers 68 and 70 are respectively coupled to a pair of rectifiers 72 and 74 which provide a DC voltage output. The respective DC outputs of the rectifiers 72 and 74 are fed to an analog to digital converter and encoder 76 and 78. A digital comparator and logic circuit 80 is coupled to the digitally encoded output of the circuit components 76 and 78 and operates to determine which of the two inputs is of a greater magnitude and to enable an output from the channel having the greater magnitude. Seven levels of magnitude are coupled to an enabled driver 82 or 84 which controls the left and right indicators 60 and 62 comprising the bar display elements shown in FIG. 2 to indicate the level of the sound received in that particular channel.

Figure 4:
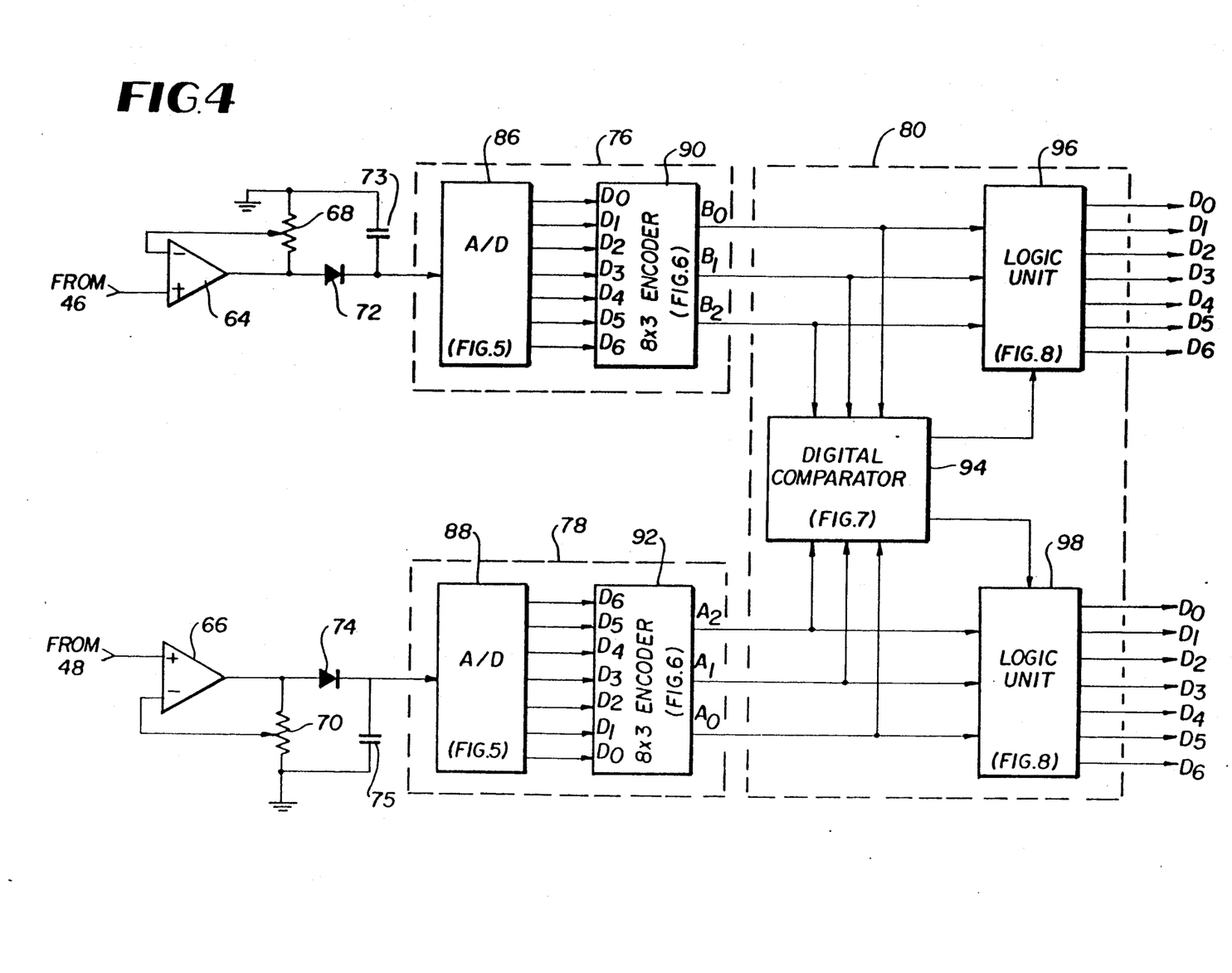
FIG. 4 is a partial electrical schematic further illustrative of the block diagram shown in FIG. 3.

The details of the circuitry shown in FIG. 3 are disclosed in the remaining FIGS. 4 through 8. Considering now FIG. 4, the input amplifiers 64 and 66 are shown comprising operational amplifiers with signal inputs from the microphones 46 and 48 being applied to the non-inverting (+) inputs thereof. The output of the operational amplifiers shown in FIG. 4 are coupled to diode rectifiers 72 and 74 between which are located the potentiometers 68 and 70. The connections shown in FIG. 4 vary slightly from that shown in FIG. 3 in that the slider elements are coupled back to the inverting (−) inputs of the operational amplifiers 64 and 66. In addition, filter capacitors 73 and 75 are shown coupled from the output of the rectifier diodes 72 and 74 to ground.

The analog to digital converter and encoder circuits 76 and 78 are shown further comprising analog to digital converter blocks 86 and 88, which provide seven outputs. These outputs are fed to 8×3 digital encoders 90 and 92 which provide three outputs each and which are, in turn, coupled to a digital comparator circuit 94, and a pair of logic units 96 and 98 which include seven outputs each.

As shown in FIG. 5, each analog to digital converter 86 and 88 is comprised of seven parallel signal comparators comprised of operational amplifiers 100, 102 . . . 110, 112 whose non-inverting inputs are commonly coupled to the input voltage from a diode rectifier (FIG. 4) and dropped across resistor 114. The inverting inputs are coupled to selected equal valued voltage points of a voltage divider network 116 consisting of a series string of fixed resistors 118 coupled between a positive source of voltage and ground. The A/D converter operates to convert the analog DC input signal appearing on circuit lead 119 to a 7-bit digital output code $D_6$, $D_5$ . . . $D_1$, $D_0$ at terminals 120 . . . 131 which ranges in value from 0000001 to 1111111 according to the magnitude of the input signal.

Further, as shown in FIG. 4, seven output leads from the A/D converters 86 and 88 are respectively fed to seven inputs $D_0$, $D_1$ . . . $D_6$ of two identical 8×3 encoders 90 and 92 which translates the seven bit outputs of the respective A/D converters into respective three bit binary codes $B_0$, $B_1$, $B_2$ and $A_2$, $A_1$ and $A_0$.

Figure 6:
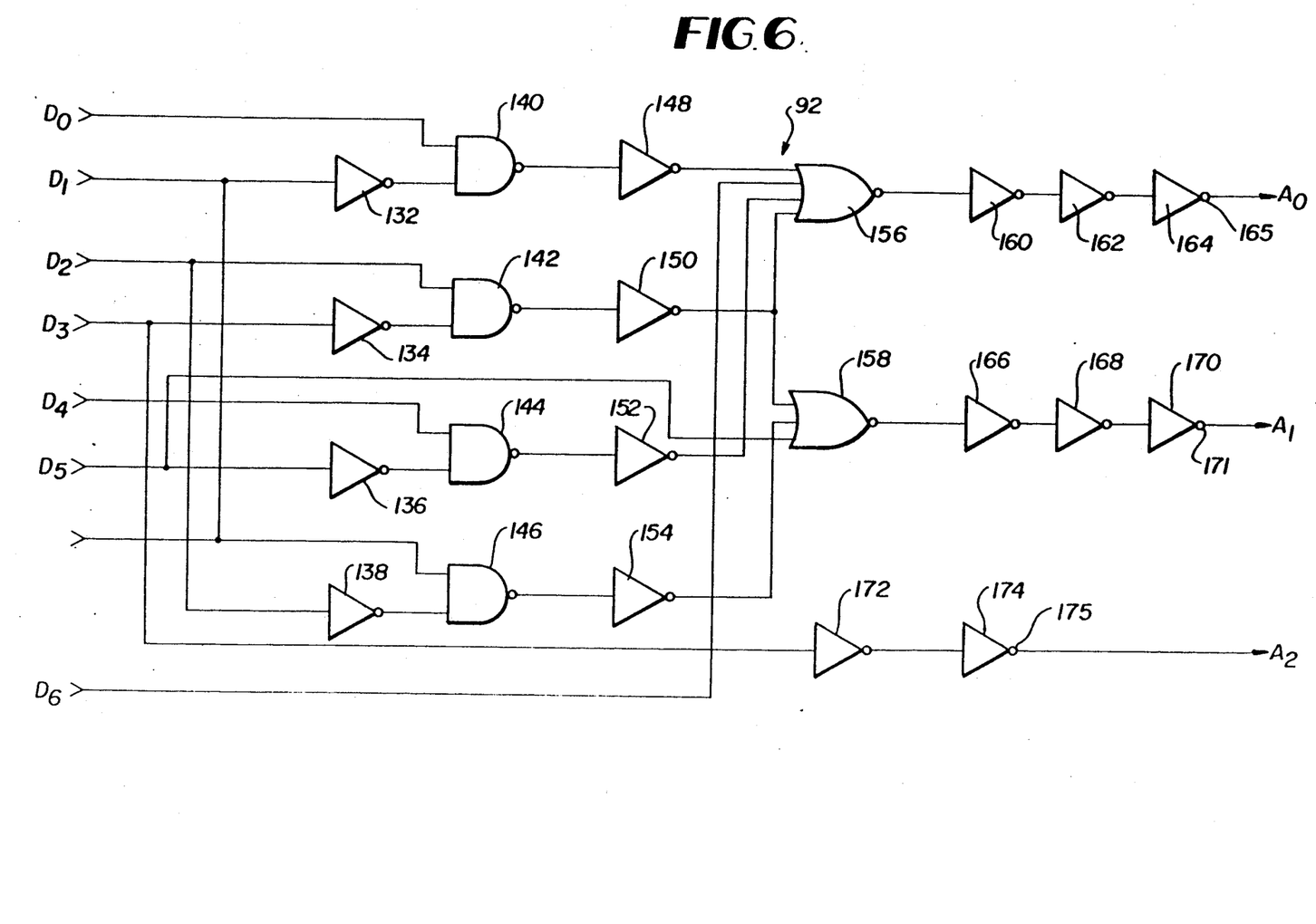
FIG. 6 is an electrical schematic diagram illustrative of the 8×3 digital encoder shown in FIG. 4.

Referring now to FIG. 6, there is shown the details of one of the encoders, i.e. encoder 92, which provides outputs of $A_0$, $A_1$, and $A_2$. The encoder is comprised of four signal inverters 132, 134, 136, 138 coupled to signal input lines $D_1$, $D_3$, $D_5$, $D_2$, respectively. Four NAND gates 140, 142, 144 and 146 have one input respectively coupled to the input line $D_0$, $D_2$, $D_4$ and $D_1$ while their other inputs are connected to the outputs of the inverters 132, 134, 136 and 138. A set of four intermediate logic inverters 148, 150, 152 and 154 are coupled to the output of the NAND gates 140, 142, 144 and 146 which selectively couple into a pair of NOR gates 156 and 158 along with the input lines $D_5$ and $D_6$. The output of the NOR gate 156 is fed through three logic inverters 160, 162 and 164 where the output $A_0$ appears at terminal 165. The output of the NOR gate 158 is fed through three logic inverters 166, 168 and 170 where the output $A_1$ is provided at terminal 171. The third output $A_2$ is provided at terminal 175 by a pair of series connected logic inverters 172 and 174 connected to input line $D_3$.

The following truth table illustrates the three bit binary code which is generated in response to the six inputs $D_0$ . . . $D_6$.

TABLE I

| INPUT | | | | | | | OUTPUT | | |
|---|---|---|---|---|---|---|---|---|---|
| $D_6$ | $D_5$ | $D_4$ | $D_3$ | $D_2$ | $D_1$ | $D_0$ | $A_2$ | $A_1$ | $A_0$ |
| 0 | 0 | 0 | 0 | 0 | 0 | 1 | 0 | 0 | 1 |
| 0 | 0 | 0 | 0 | 0 | 1 | 1 | 0 | 1 | 0 |

TABLE I-continued

| D6 | D5 | D4 | D3 | D2 | D1 | D0 | A2 | A1 | A0 |
|---|---|---|---|---|---|---|---|---|---|
| 0 | 0 | 0 | 0 | 1 | 1 | 1 | 0 | 1 | 1 |
| 0 | 0 | 0 | 1 | 1 | 1 | 1 | 1 | 0 | 0 |
| 0 | 0 | 1 | 1 | 1 | 1 | 1 | 1 | 0 | 1 |
| 0 | 1 | 1 | 1 | 1 | 1 | 1 | 1 | 1 | 0 |
| 1 | 1 | 1 | 1 | 1 | 1 | 1 | 1 | 1 | 1 |

Figure 7:
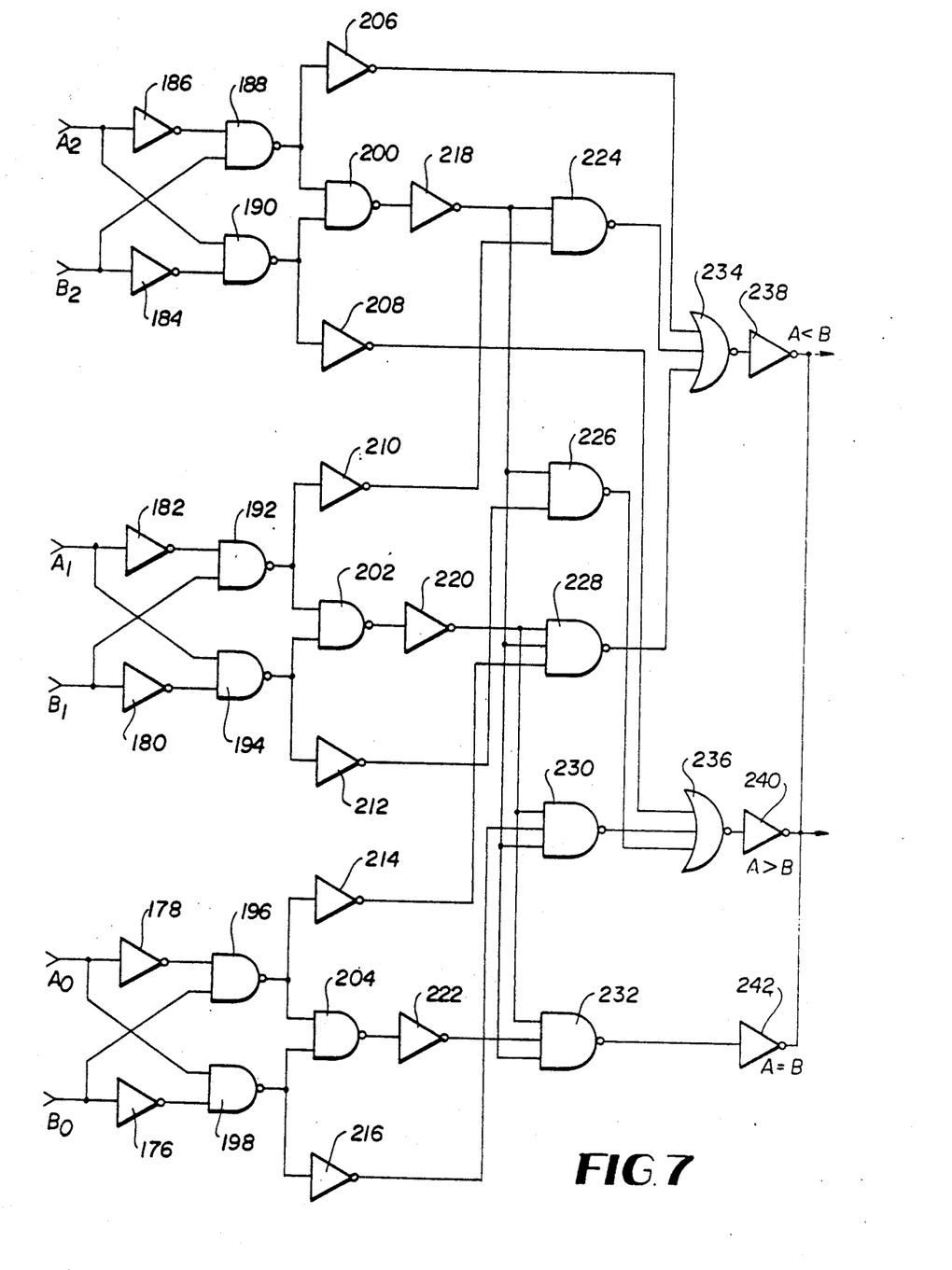
FIG. 7 is an electrical schematic diagram illustrative of the digital comparator circuit shown in FIG. 4.

The Boolean equations for the outputs $A_0$, $A_1$, $A_2$ are:
$A_0 = D_0 D_1 + D_2 D_3 + D_4 D_5 + D_6$
$A_1 = D_1 D_2 + D_2 D_3 + D_5$
$A_2 = D_3$ Next, the digital comparator 94 is shown in FIG. 7 and is used to compare the signals being conducted in the left and right channels to generate control signals $A < B$, $A > B$ and $A = B$ to enable the logic units 96 and 98. The comparator as shown in FIG. 7 includes three pairs of input lines for the signals $A_0$, $B_0$ ... $A_2$, $B_2$. These signals are fed to respective signal inverters 176, 178, 180, 182, 184 and 186 with cross coupled inputs and outputs of the logic inverters being fed to six NAND gates 188, 190 198. Adjoining pairs of NAND gate outputs are next fed to three NAND gates 200, 202 and 204 and which are also respectively connected to six intermediate logic inverters 206, 208 ... 216. The outputs of the NAND gates 200, 202 and 204 are coupled to respective logic inverters 218, 220 and 222. Five NAND gates 224, 226 ... 232 are selectively coupled to the logic inverters 218, 210, 212, 214, 216 and 222. Next a pair of NOR gates 234 and 236 are included with the NOR gate 234 having inputs connected thereto from the output of the logic inverter 206 and the two NAND gates 224 and 228. The second NOR circuit receives inputs from the logic inverter 208 and the two NAND gates 226 and 230. A logic inverter 238 is coupled to the output of the NOR gate 234 and provides an output when $A < B$ and is fed as an enabling signal to the logic unit 96 (FIG. 4).

In a like manner, logic gate 240 is coupled to the output of the NOR gate 236 and provides an output when the signal $A > B$ and comprises an enabling signal which is coupled to the logic unit 98. The output of the NAND gate 232 is coupled to a third logic inverter 242 whose output comprises a signal $A = B$. Under such circumstances, an enabling signal is fed to both logic units 96 and 98. The operation of the comparator circuit shown in FIG. 7 can readily be understood with reference to the following Truth Table II. FIG. 9 represents another embodiment of the invention which provides a solution to a significant problem encountered by the deaf or hearing impaired while operating motor vehicles in the vicinity of emergency vehicles. The system portrayed by FIG. 9 allows for such persons to be alerted to the emergency siren alarms through a plurality of microphones placed about the vehicle. One such system, illustrated by FIG. 9 has three microphones placed left, right and rear. The system electronics is the same as that illustrated in the prior figures except an additional channel is included for a third direction, for example, a rear facing direction. The signals from the three microphones are fed to three A/D converters, the same or similar to elements 86 and 88, depicted in FIG. 4. The outputs of these converters drive a comparator similar to that shown in FIG. 4, element 94, except that this is a three channel comparator with an enabling input. The enabling input is designed to receive an RF signal transmitted from the emergency vehicle, only allowing a display to occur when that RF input is received, thus avoiding displays caused by other sources not emanating from the emergency alarm system. The enabling input receives the signal from an RF antenna and then converts that RF signal to a DC signal by conventional methods, the DC signal being the required signal to enable the comparator. As illustrated, the enable signal controls the comparator but could be used to enable other functions of the system. The output displays the signal that is the most intense of those signals received by the microphones. The most intense signal from the comparator, once enabled, is fed to the appropriate display driver, which drivers are the same or similar to those illustrated in FIG. 3 as elements 82 and 84, that, in turn, drive the lights of the display unit which are associated with the most intense signal. Again, the lights which are lit give the hearing impaired vehicle driver an indication of the direction from which the most intense audio signal is coming.

TABLE II

| INPUT | | | | | | OUTPUT | | | |
|---|---|---|---|---|---|---|---|---|---|
| $A_2$ | $A_1$ | $A_0$ | $B_2$ | $B_1$ | $B_0$ | A | B | A | B |
| 1 | 0 | 0 | 0 | 0 | 0 | 1 | | 0 | |
| 1 | 0 | 0 | 0 | 0 | 1 | 1 | | 0 | |
| 1 | 0 | 0 | 0 | 1 | 0 | 1 | | 0 | |
| 1 | 0 | 0 | 0 | 1 | 1 | 1 | | 0 | |
| 0 | 0 | 0 | 1 | 0 | 0 | 0 | | 1 | |
| 0 | 0 | 1 | 1 | 0 | 0 | 0 | | 1 | |
| 0 | 1 | 0 | 1 | 0 | 0 | 0 | | 1 | |
| 0 | 1 | 1 | 1 | 0 | 0 | 0 | | 1 | |
| 0 | 1 | 1 | 0 | 1 | 0 | 1 | | 0 | |
| 0 | 1 | 1 | 0 | 0 | 1 | 1 | | 0 | |
| 0 | 1 | 1 | 0 | 0 | 0 | 1 | | 0 | |
| 0 | 1 | 0 | 0 | 1 | 1 | 0 | | 1 | |
| 0 | 0 | 1 | 0 | 1 | 1 | 0 | | 1 | |
| 0 | 0 | 0 | 0 | 1 | 1 | 0 | | 1 | |
| 0 | 0 | 1 | 0 | 0 | 0 | 1 | | 0 | |
| 0 | 0 | 0 | 0 | 0 | 1 | 0 | | 1 | |

Figure 8:
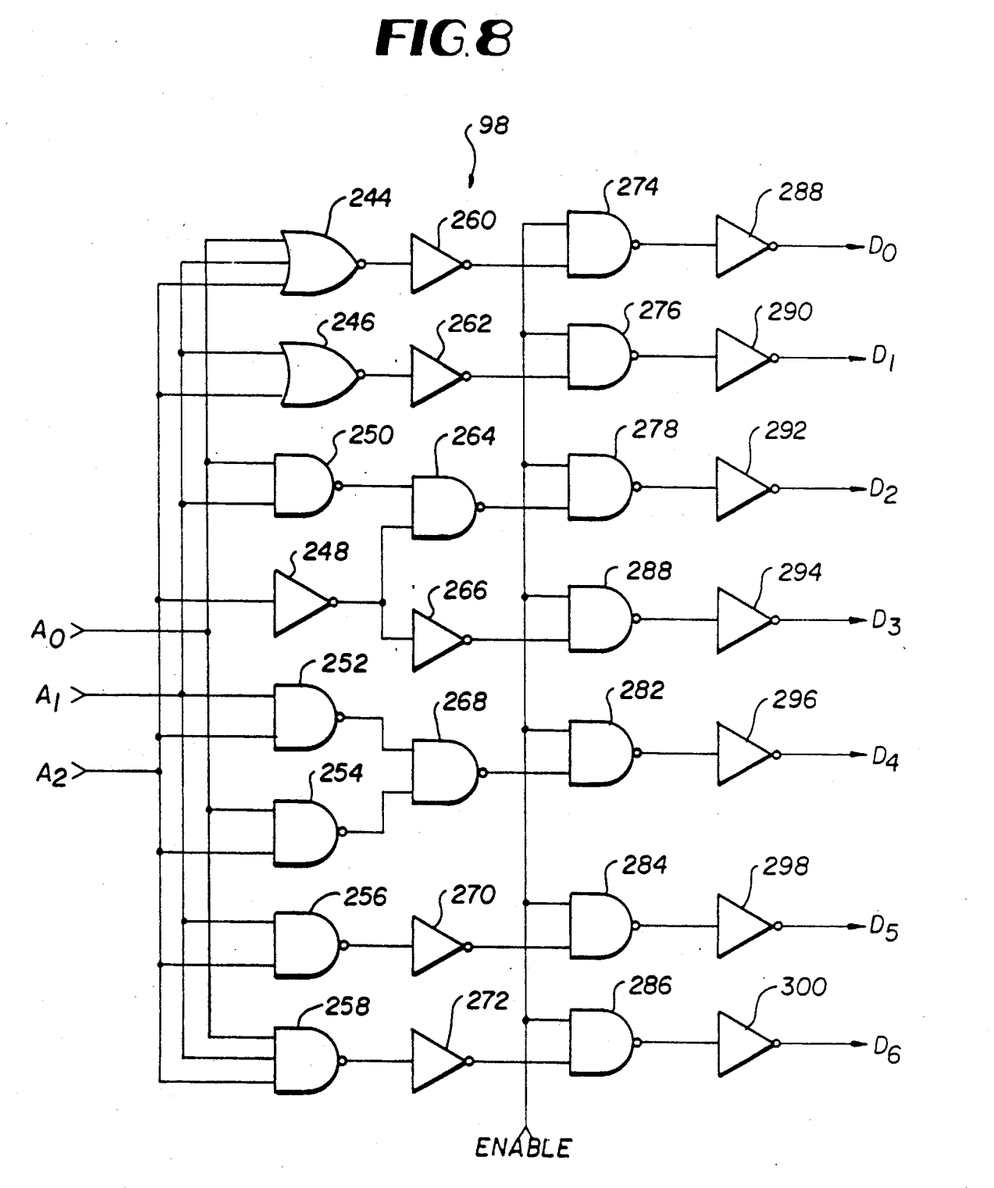
FIG. 8 is an electrical schematic diagram illustrative of one of the digital logic units shown in FIG. 4.
Figure 9:
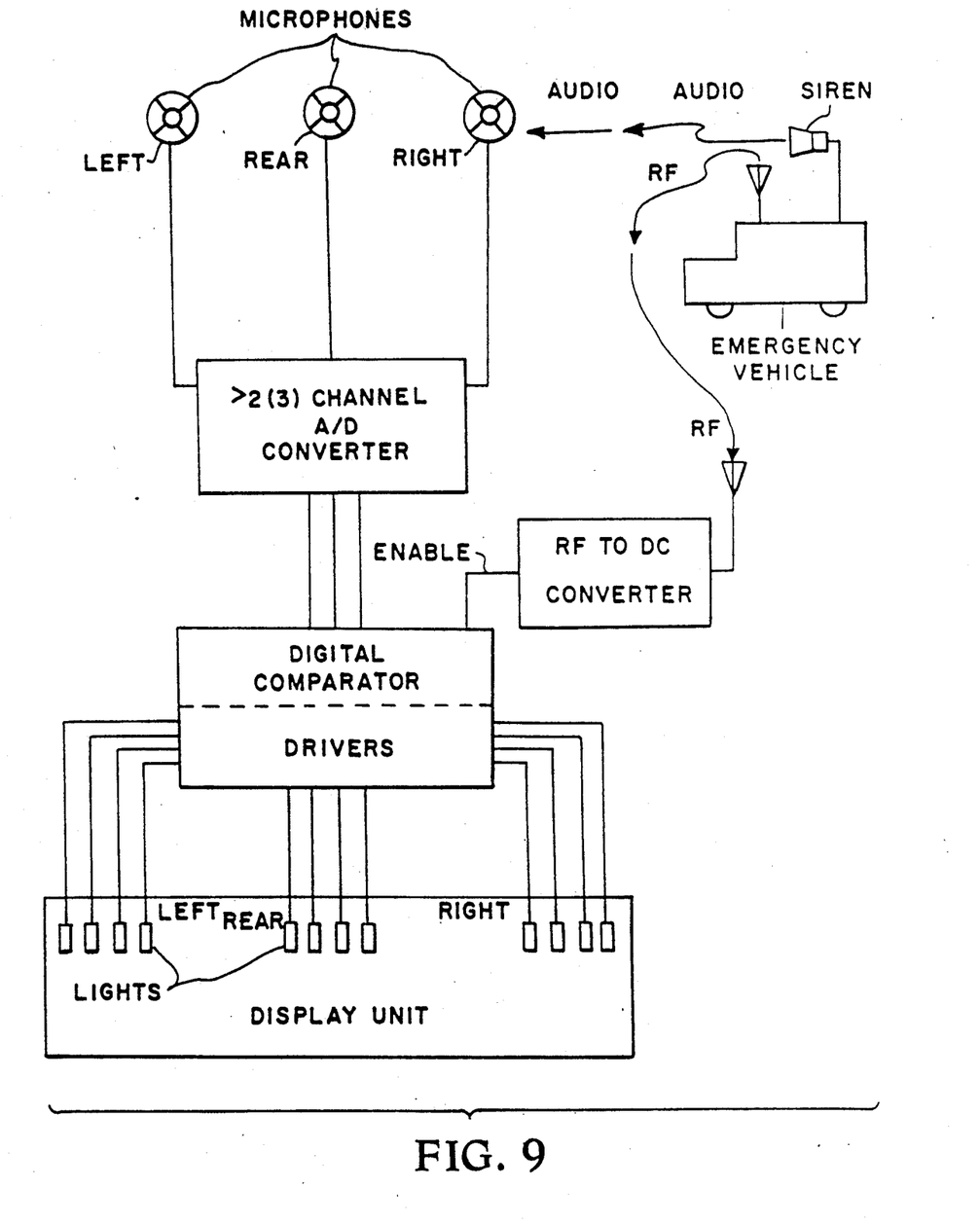
FIG. 9 is an electrical block diagram generally illustrative of a three channel, vehicle mounted visual aid for receiving signals from an emergency vehicle in accordance with the invention.

The design of one of the logic units 96 and 98, i.e. logic unit 98, is shown in FIG. 8. These circuits function to translate the respective three bit binary codes $A_0$, $A_1$, $A_2$ and $B_0$, $B_1$ and $B_2$ into seven different signal output levels $D_0$, $D_1$ ... $D_6$ which are used to drive seven bit input bar display components 60 and 62 shown in FIG. 2. Logic unit 98, for example, is comprised of input lines $A_0$, $A_1$ and $A_2$ which are coupled to two NOR gates 244 and 246, a logic inverter 248 and five NAND gates 250, 252 ... 258. The outputs of the two NOR gates 244 and 246 are coupled to logic inverters 262. The output of the NAND gate 250 is connected to a first intermediate NAND gate 264 along with the output of the logic inverter 285 which is also coupled to the logic inverter 266. The outputs of the two NAND gates 252 and 254 are coupled to a second intermediate NAND gate 268. The two bottom input NAND gates 256 and 258 are coupled to respective logic inverters 270 and 272. The intermediate logic elements are respectively coupled to one input of seven output NAND gates 274, 276 ... 286 whose other inputs are respectively connected to a common enabling signal line, which as noted above, can be the signal $A < B$, $A > B$ or $A = B$. All seven of the output NAND gates 274, 276 ... 286 are coupled to respective logic inverters 288, 290 ... 300 which provide respective outputs of $D_0$, $D_1$ ... $D_6$ according to the Truth Table III set forth below.

TABLE III

| INPUT | | | OUTPUT | | | | | | |
|---|---|---|---|---|---|---|---|---|---|
| $A_2$ | $A_1$ | $A_0$ | $D_6$ | $D_5$ | $D_4$ | $D_3$ | $D_2$ | $D_1$ | $D_0$ |
| 0 | 0 | 1 | 0 | 0 | 0 | 0 | 0 | 0 | 1 |
| 0 | 1 | 0 | 0 | 0 | 0 | 0 | 0 | 1 | 0 |
| 0 | 1 | 1 | 0 | 0 | 0 | 0 | 1 | 0 | 0 |
| 1 | 0 | 0 | 0 | 0 | 0 | 1 | 0 | 0 | 0 |
| 1 | 0 | 1 | 0 | 0 | 1 | 0 | 0 | 0 | 0 |
| 1 | 1 | 1 | 1 | 0 | 0 | 0 | 0 | 0 | 0 |

The Boolean equations for the outputs of the logic circuits shown in FIG. 8 are:

$D_0 = A_0 + A_1 + A_2$
$D_1 = A_1 + A_2$
$D_2 = A_0 A_1 + A_2$
$D_3 = A_2$
$D_4 = A_1 A_2 + A_0 A_2$
$D_5 = A_1 A_2$
$D_6 = A_0 A_1 A_2$

The electronic circuitry shown and described has been implemented in a custom built monolithic integrated circuit structure using 3-micron P-well CMOS technology; however, when desirable, it can readily be fabricated using other types of discrete integrated circuits well known to those skilled in the art.

Having thus shown and described what is at present considered to be the preferred embodiments of the invention, it should be noted that the same has been made by way of illustration and not limitation. Accordingly, all modifications, alterations and changes coming within the spirit and scope of the invention are herein meant to be included.

We claim:

1. A direction discriminating visual aid comprising: visual aid support means;
   at least two microphones located on said support means in a spaced apart relationship and being responsive to sounds received from at least two different directions by generating analog signals related to said sounds;
   at least two signal channels including first and second circuit means respectively coupled to said microphones, said first and second circuit means each including means for converting said analog signals into digital signals, said means for converting said analog signals into digital signals further including amplitude control means, signal rectifier means coupled to said control means for converting a received sound signal of selected amplitude in a DC signal, and means for converting the said DC signal to multibit binary coded signal;
   third circuit means coupled to said first and second circuit means for comparing said signals in said at least two signal channels and generating only one output signal indicative of the direction from which the loudest sound emanates, said third circuit means comparing the amplitude of the signals in said at least two channels and generating an output signal which is also indicative of the intensity of said sounds, said third circuit means comprising digital comparator means which generates an output enabling signal for the signal channel of said at least two signal channels translating the signal having the larger amplitude, said digital comparator means being responsive to the multibit binary coded signal in both channels to generate said output enabling signal; and
   means coupled to said third circuit means for providing a visual indication of the direction of emanation of said loudest sound as well as its intensity, said visual indication means comprising an indicator for each of said channels.

2. The visual aid as defined by claim 1 wherein said digital comparator means generates an output enabling signal for both signal channels when respectively translating signals of substantially equal amplitude.

3. The visual aid as defined by claim 1 wherein said means for converting to a multibit binary coded signal comprises an analog to digital converter having a multibit output of a first number and a digital encoder coupled to the multibit output of said analog to digital converter and generating therefrom a multibit output of a second number.

4. The visual aid as defined by claim 3 wherein said first number is greater than said second number.

5. The visual aid as defined by claim 4 wherein said multibit output of said analog to digital signal comprises a seven bit output and said multibit output of said encoder comprises a three bit output.

6. A direction discriminating visual aid comprising:
   visual aid support means;
   at least two microphones located on said support means in a spaced apart relationship and being responsive to sounds received from at least two different directions by generating analog signals related to said sounds;
   at least two signal channels including first and second circuit means respectively coupled to said microphones, said first and second circuit means each including means for converting said analog signals into digital signals;
   third circuit means coupled to said first and second circuit means for comparing said signals in said at least two signal channels and generating only one output signal indicative of the direction from which the loudest sound emanates, said third circuit means comparing the amplitude of the signals in said at least two channels and generating an output signal which is also indicative of the intensity of said sounds, said third circuit means comprising digital comparator means which generates an output enabling signal for the signal channel of said at least two signal channels translating the signal having the larger amplitude, said third circuit means further including first and second digital logic circuit means respectively coupled to said means for converting said analog signals into digital signals of said first and second circuit means and to said comparator means for generating a respective digital output of the signal amplitude of said signal channels, one of which is further enabled by said digital comparator for outputting the signal having the larger amplitude; and
   means coupled to said third circuit means for providing a visual indication of the direction of emanation of said loudest sound as well as its intensity, said visual indication means comprising an indicator for each of said channels, said indicator for each of said signal channels being selectively energized by the enabled digital logic circuit to indicate both the direction and intensity of the received sounds.

7. The hearing aid as defined by claim 6 wherein said digital output from said digital logic circuit means comprises a multibit digital output and additionally including a multibit input digital driver circuit coupled to each said logic circuit means for energizing the indicator of the respective signal channel.

8. A direction discriminating visual aid comprising:
   visual aid support means;
   at least two microphones located on said support means in a spaced apart relationship and being responsive to sounds received from at least two different directions by generating analog signals related to said sounds;
   at least two signal channels including first and second circuit means respectively coupled to said microphones, said first and second circuit means each including means for converting said analog signals into digital signals, said means for converting analog signals into digital signals of said first and second circuit means including an analog to digital converter having a multibit output of a first plurality and a digital encoder coupled to the output of said analog to digital converter and generating therefrom a multibit output of a second plurality;
   third circuit means coupled to said first and second circuit means for comparing said signals in said at least two signal channels and generating only one output signal indicative of the direction from which the loudest sound emanates, said third circuit means comparing the amplitude of the signals in said at least two channels and generating an output signal which is also indicative of the intensity of said sounds, said third circuit means comprising digital comparator means which generates an output enabling signal for the signal channel of said at least two signal channels translating the signal having the larger amplitude, said third circuit means further including first and second digital logic circuit means respectively coupled to said multibit output of said digital encoder of said first and second circuit means, said first and second digital logic circuit means further being coupled to said comparator means for receiving an enabling signal therefrom and being operable to generate a respective digital output of the signal amplitude applied thereto from said respective digital encoder when enabled, whereby the signal having the larger amplitude will be outputted; and
   means coupled to said third circuit means for providing a visual indication of the direction of emanation of said loudest sound as well as its intensity, said visual indication means comprising an indicator for each of said channels, said indicator for each of said channels being selectively energized by the enabled digital logic circuit to indicate both the intensity and direction of the source of the sounds received by said microphones.

9. The visual aid as defined by claim 8 wherein said digital encoder of said first and second circuit means includes a multibit output and wherein said first and second digital logic circuit means includes a multibit input equal in number to the multibit output of said encoders.

10. The visual aid as defined by claim 9 wherein said first number is greater than said second number.

11. The visual aid as defined by claim 10 wherein said multibit output of said analog to digital signal comprises a seven bit output and said multibit output of said said encoder comprises a three bit output.

12. A visual aid adapted to provide an indication of the direction from which sounds are received, comprising:
   support means worn on the body of a user;
   a plurality of microphones located on said support means and being in a spaced apart relationship, said microphones being responsive to sounds received from different directions;
   a plurality of signal channels, one for each of said microphones, said channels including circuit means respectively coupled to said microphones for at least amplifying the signals generated by the respective microphones in response to sounds received thereby;
   circuit means coupled to said signal channels for comparing the amplitudes of the respective signals and generating at least one output signal corresponding to the larger signal amplitude; and,
   indicator means for each signal channel being selectively energized in response to said output signal to indicate the direction from which the loudest sound is received by said microphones.

13. A visual aid adapted to provide an indication of the direction from which sounds are received, comprising:
   a support means comprising a piece of headwear;
   a plurality of microphones located on said support means and being in a spaced apart relationship, said microphones being responsive to sounds received from different directions;
   a plurality of signal channels, one for each of said microphones, said channels including circuit means respectively coupled to said microphones for at least amplifying the signals generated by the respective microphones in response to sounds received thereby;
   circuit means coupled to said signal channels for comparing the amplitudes of the respective signals and generating at least one output signal corresponding to the larger signal amplitude; and,
   indicator means for each signal channel being selectively energized in response to said output signal to indicate the direction from which the loudest sound is received by said microphones.

14. A visual aid adapted to provide an indication of the direction from which sounds are received, comprising:
   support means comprising a frame for eyeglasses;
   a plurality of microphones located on said support means and being in a spaced apart relationship, said microphones being responsive to sounds received from different directions;
   a plurality of signal channels, one for each of said microphones, said channels including circuit means respectively coupled to said microphones for at least amplifying the signals generated by the respective microphones in response to sounds received thereby;
   circuit means coupled to said signal channels for comparing the amplitudes of the respective signals and generating at least one output signal corresponding to the larger signal amplitude; and,
   indicator means for each signal channel being selectively energized in response to said output signal to indicate the direction from which the loudest sound is received by said microphones.

* * * * *